(12) United States Patent
Loentgen et al.

(10) Patent No.: US 11,808,114 B2
(45) Date of Patent: Nov. 7, 2023

(54) SUBSEA INSTALLATIONS COMPRISING HEATED CONDUITS

(71) Applicant: Acergy France SAS, Suresnes (FR)

(72) Inventors: Vincent Loentgen, Chambry (FR); Olivier Lodeho, Paris (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 17/439,352

(22) PCT Filed: Mar. 13, 2020

(86) PCT No.: PCT/IB2020/000273
§ 371 (c)(1),
(2) Date: Sep. 14, 2021

(87) PCT Pub. No.: WO2020/188362
PCT Pub. Date: Sep. 24, 2020

(65) Prior Publication Data
US 2022/0213764 A1 Jul. 7, 2022

(30) Foreign Application Priority Data

Mar. 15, 2019 (GB) ...................... 1903542

(51) Int. Cl.
*E21B 36/04* (2006.01)
*E21B 43/01* (2006.01)
(Continued)

(52) U.S. Cl.
CPC ............ *E21B 43/01* (2013.01); *E21B 17/028* (2013.01); *E21B 36/04* (2013.01); *F16L 53/38* (2018.01)

(58) Field of Classification Search
CPC ............ E21B 36/04; E21B 43/01; F16L 53/38
See application file for complete search history.

(56) References Cited

U.S. PATENT DOCUMENTS 6,371,693 B1 * 4/2002 Kopp ...................... F16L 53/37
137/341
6,617,556 B1 * 9/2003 Wedel ..................... E21B 43/01
219/661
(Continued)

FOREIGN PATENT DOCUMENTS

| CN | 103883834 A | * | 6/2014 | ............ F16L 53/008 |
| EP | 3 421 715 | | 1/2019 | |

(Continued)

OTHER PUBLICATIONS

Denniel, Sylvain et al., "Electrically heated pipe-in-pipe—A qualified reelable technology to meet flow assurance challenges," Offshore Magazine, vol. 71, Issue 9, Sep. 1, 2011.
(Continued)

Primary Examiner — Matthew R Buck
(74) Attorney, Agent, or Firm — Mattingly & Malur, PC

(57) ABSTRACT

A subsea installation for the production of hydrocarbons includes a flowline and a group of heating cables extending along the flowline. A star end termination effecting short-circuit connection between the heating cables of the group is located at a subsea location remote from the flowline. For example, a subsea structure or fluid conduit in fluid communication with the flowline, such as a PLET or a spool, can (Continued)

be interposed between the termination and the flowline. The termination may be a module that is connectable electrically to the heating cables via flying leads and connector hubs.

25 Claims, 2 Drawing Sheets

(51) Int. Cl.
*F16L 53/38* (2018.01)
*E21B 17/02* (2006.01)

(56) References Cited

U.S. PATENT DOCUMENTS

| | | | |
|---|---|---|---|
| 7,992,632 B2 * | 8/2011 | Bornes | H05B 3/58 166/61 |
| 9,018,569 B2 * | 4/2015 | Geertsen | H05B 6/06 219/535 |
| 10,285,223 B2 * | 5/2019 | Hatton | H05B 3/14 |
| 10,704,727 B2 | 7/2020 | Pionetti et al. | |
| 2016/0165666 A1 * | 6/2016 | Colpa | B23K 35/3033 219/544 |
| 2016/0316518 A1 * | 10/2016 | Lewandowski | H05B 3/36 |
| 2019/0137025 A1 | 5/2019 | Iversen et al. | |

FOREIGN PATENT DOCUMENTS

| | | | |
|---|---|---|---|
| FR | 2 978 006 | 1/2013 | |
| GB | 2492883 | 1/2013 | |
| GB | 2549102 | 10/2017 | |
| WO | WO 2007/055592 | 5/2007 | |
| WO | WO 2017/182721 | 10/2017 | |
| WO | WO 2018/231562 | 12/2018 | |
| WO | WO-2019064014 A1 * | 4/2019 | ............. F16L 53/38 |

OTHER PUBLICATIONS

Roth, Rebecca, "Direct Electrical Heating of Flowlines—A Guide to Uses and Benefits," OTC 22631, Offshore Technology Conference, Brazil, Oct. 2011.

Angays, Philippe, "High efficiency heating method for subsea pipelines heating," IEEE Industry Applications Society 2011 Record of Conference papers.

Candelier, C. et al., "Subsea Pipeline Electrical Heat Trace (EHT)—"Active" Heating—Application for a Deep Water Brown Field Development," 12th Offshore Mediterranean Conference, 2015.

SST Group, Heat Tracing Solutions Catalog, 2018.

* cited by examiner

SUBSEA INSTALLATIONS COMPRISING HEATED CONDUITS

This invention relates to subsea installations comprising conduits that are heated for flow assurance. More specifically, the invention relates to subsea conduits that are fitted with electrical heating systems, such as pipelines and spools as used in the oil and gas industry.

Subsea pipelines are used as 'tie-backs' to transport crude oil and/or natural gas from a subsea wellhead across the seabed on the way to the surface. Typically, in offshore locations, the oil and/or gas flows up a riser from the seabed to the surface to undergo treatment and temporary storage at a surface installation.

Oil and gas are present in subterranean formations at elevated temperature and pressure, which may be increased by the injection of fluids such as steam. On production of the oil or gas, the produced fluid emerges from the wellhead and enters a subsea pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high despite thermal exchange with the surrounding seawater, which is invariably much colder.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. When production restarts, temperature within the pipeline must be increased quickly so that no plugs will form.

The challenges of thermal management increase as subsea pipelines become longer. In this respect, there is a trend toward longer tie-backs as oil and gas reserves are being exploited in increasingly challenging locations.

Designers of subsea pipelines have adopted both passive and active approaches to thermal management, either individually or in combination.

In passive thermal management systems, the pipeline is thermally insulated to retain heat in the pipeline. Conversely, active thermal management systems add heat to the pipeline. For example, heat may be added by thermal exchange with hot fluids flowing along or around the pipeline. In an alternative approach, heat may be added by electrical heating systems.

One example of an electrical heating system is a trace heating system comprising resistive electrical wires or cables running along, and in thermal contact with, the outer surface of a steel flowline pipe. Heat produced by passing an electric current along the cables is conducted firstly from the cables to the pipe wall and secondly through the pipe wall to the produced fluid flowing within the flowline. As an alternative to resistive heating of the cables, heat may be generated by currents induced in the pipeline wall beside the cables. The paper OTC 22631 presented at the 2011 Offshore Technology Conference in Brazil describes these and other approaches to the electrical heating of subsea pipelines.

In long resistive trace-heated pipelines powered by a three-phase electrical supply, three heating cables are employed, one for each phase. The cables extend along the pipeline parallel to each other, being arranged either helically around and along the central longitudinal axis of the pipeline or in straight lines parallel to that axis. In the latter case, the cables are suitably equi-angularly spaced around the central longitudinal axis.

A neutral point or 'star end' is formed by a wye connection at an end of the heating cables. At the star end, the three heating cables are connected together in short-circuit. Such a star end is exemplified in FR 2978006, which discloses a trace-heated pipeline fitted with a triphasic heating system and having redundant heating cables.

WO 2007/055592 also shows three heating cables on a pipeline, in this case for induction heating, which are short-circuited together at one end. The sole drawing in WO 2007/055592 is merely schematic and shows the resulting star end spaced from the end of the pipeline, apparently by cantilevered overhanging portions of the heating cables. However, accompanying text in the same drawing refers to short-circuiting at the end of the pipe, which is conventional.

Suspending the star end from straight unsupported portions of the cables, as shown schematically in WO 2007/055592, would be structurally impossible. Thus, in the absence of any explanation or further teaching, the arrangement illustrated in WO 2007/055592 can only be interpreted as artistic license for ease of illustration.

WO 2017/182721 shows that heating cables may also be connected electrically by a metallic ring attached to a heated pipeline. The ring serves as a neutral point or star coupling between the heating cables. Hence, a star coupling between heating cables does not necessarily have to be situated at an end of a pipeline.

Whilst multiple star-end connections can be made along the length of a trace heating system, the number of such connections has to be minimised because each one creates a short circuit and results in power loss. Another drawback of star ends is that they heat up significantly, which in some situations could cause thermal damage to the cables or to adjoining structures or materials.

WO 2018/231562 and U.S. Pat. No. 6,371,693 show further examples of electrically heated subsea pipelines.

Against this background, the invention provides a subsea installation for the production of hydrocarbons. The installation comprises: a flowline; a first group of heating cables extending along the flowline; and a termination effecting short-circuit connection between the heating cables of the first group; wherein the termination is located at a subsea location remote from the flowline.

The installation may further comprise at least one connecting conduit in fluid communication with the flowline, wherein the termination is connected electrically to the first group of heating cables via at least one second group of heating cables that extends along the or each connecting conduit.

The or each connecting conduit may be a jumper or spool in fluid communication with at least one subsea structure that is in fluid communication with the flowline.

At least one subsea structure in fluid communication with the flowline, such as a wellhead, a manifold or a pipeline accessory, may be interposed between the termination and the flowline. In that case, the termination may conveniently be mounted on one such subsea structure interposed between the termination and the flowline. Also, electrical connection between the termination and the first group of heating cables may be made via electrical connections in at least one such subsea structure interposed between the termination and the flowline. Conversely, electrical connection between the termination and the first group of heating cables may bypass at least one such subsea structure interposed between the termination and the flowline.

The termination may be connected electrically to the first group of heating cables via at least one set of ROV-connectable flying leads. In that case, the installation suitably further comprises connector hubs to which the flying leads are ROV-connectable.

The termination suitably comprises: connectors corresponding to the heating cables of the first group; and conductors extending from the connectors to a neutral point. The termination may further comprise heat-exchange formations in thermal communication with the neutral point and/or a housing that supports the connectors and that surrounds the conductors and the neutral point. A mount or foundation may also be provided for supporting the termination.

The connectors of the termination may comprise a set of ROV-connectable flying leads or at least one connector hub that is engageable with a set of ROV-connectable flying leads.

The inventive concept embraces a termination module for effecting short-circuit connection between a group of subsea heating cables, the termination module comprising: connectors corresponding to the heating cables of the group; and conductors extending from the connectors to a neutral point.

The inventive concept also extends to a method of installing a subsea installation for the production of hydrocarbons. That method comprises: placing a termination at a subsea location remote from an electrically-heated subsea flowline; and electrically connecting the termination to a first group of heating cables extending along the flowline, to effect short-circuit connection between those heating cables.

A star end located traditionally on a pipeline prevents electrical heating extensions from the pipeline to other structures such as spools. The invention therefore solves the problem of extending electrical heating of a subsea pipeline to other structures or ancillary equipment.

Embodiments of the invention provide a termination for an underwater electrical heating system, which system comprises at least three phases, wherein the termination connects the three phases in a short circuit and is located in water separately from the heated equipment. The electrical heating system may for example be a trace-heating system, which may employ resistive heating.

The star-end connection may be embedded, encapsulated or enclosed in a sealed package, which may be defined by a tape, a moulded thermoset or thermoplastic polymer, an epoxy, a ceramic or other materials. Such a package may have a radiator shape or formation to optimise heat exchange with surrounding water. Alternatively, the star-end connection may be submerged freely in the surrounding water and so may be exposed directly to that water.

Embodiments of the invention also provide an underwater trace-heated system, the system comprising at least one trace-heated flow path for transporting a fluid such as crude oil and trace-heating cables transporting three electrical power phases, arranged along the trace-heated flow path, and at least one star-end connection, located in water, connecting at least one cable for each phase in a short-circuit. The trace-heated system may comprise multiple star-end connections.

The flow path may comprise at least one pipeline, jumper or spool, and may include piping in a subsea structure or a wellhead.

The trace-heating cables suitably comprise cables arranged along the flow path and electrical connectors between successive sections of cables.

Embodiments of the invention also provide a modular star-end connection for an underwater triphasic trace-heating system, the connection comprising an electrical connector hub, cables for the three phases, and a short-circuit connection of at least one cable for each phase.

The same star end module can be connected on the same connectors as flying leads, which allows phased development.

The invention addresses the problem of heating ancillary components, structures or equipment such as spools and manifolds using electrical energy from a trace-heated flowline. This obviates the alternative of dedicated heating solutions that require associated dedicated power distribution cables.

In summary, the invention aims to heat external equipment or structures connected to a trace-heated flowline and to solve the challenges of doing so. The principle of the invention is employed at an end of a heated section of a trace-heated flowline, where the star end is normally located. The star end is instead marinised and located outside the flowline in the surrounding environment. This takes electrical power from the flowline, in effect extending the power-supply capability of the flowline to another subsea location. Heat may thereby be provided to equipment or structures external to the flowline, such as spools or manifolds, using energy conveyed along and beyond the heating section of the flowline.

By locating the star end in a cold-water environment, the star end can be cooled because heat generated at the star end due to short-circuiting can be dissipated more readily. The star end can also be repaired or replaced more easily in case of failure. Connections between parts of the system may be based on familiar solutions known for the supply of electrical energy subsea, typically electrical double-barrier connectors.

Thus, the invention provides a subsea installation that comprises a flowline and a group of heating cables extending along the flowline. A star end termination effecting short-circuit connection between the heating cables of the group is located at a subsea location remote from the flowline. For example, a subsea structure or fluid conduit in fluid communication with the flowline, such as a PLET or a spool, may be interposed between the termination and the flowline. The termination may be a module that is connectable electrically to the heating cables via flying leads and connector hubs.

In order that the invention may be more readily understood, reference will now be made, by way of example, to the accompanying drawings in which.

Figure 1:
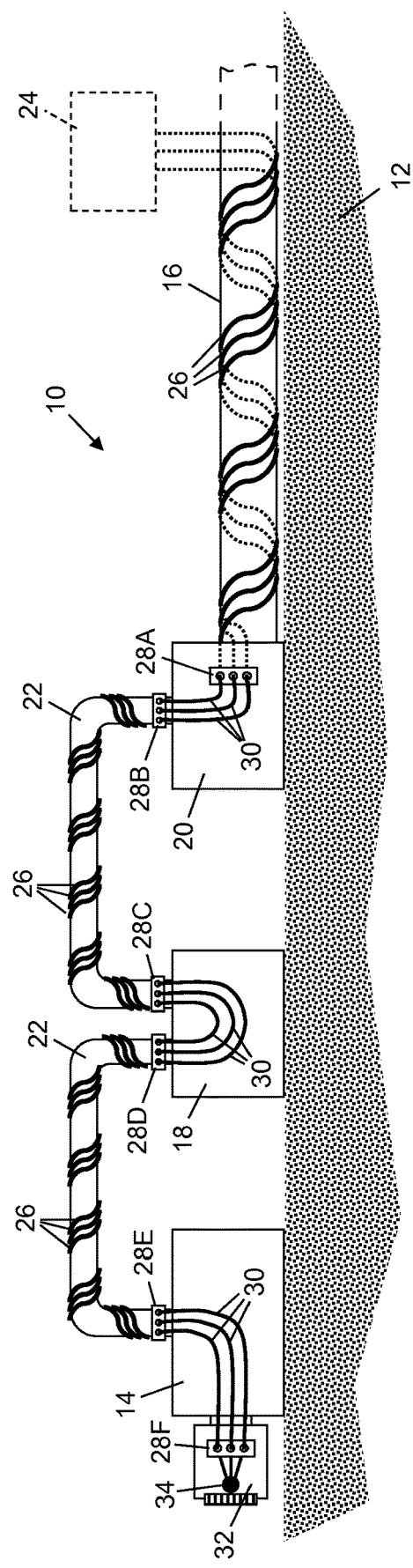
FIG. 1 is a schematic side view of a trace-heated subsea installation comprising a star end module of the invention.

Referring firstly to FIG. 1 of the drawings, a subsea oil and gas installation 10 is shown resting on the seabed 12. In this example, the installation 10 comprises a well tree 14 that supplies hydrocarbon production fluid to a subsea pipeline 16 via an intermediate manifold 18 and a pipeline end termination (PLET) 20 at an end of the pipeline 16. The direction of production fluid flow is therefore from left to right as illustrated.

The PLET 20 is an example of a pipeline accessory structure in fluid communication with the pipeline 16. Other such accessories may be positioned in-line along the length of the pipeline 16 rather than being a termination at an end of the pipeline 16.

Production fluid is conveyed between the well tree 14 and the manifold 18 and between the manifold 18 and the PLET 20 by respective connecting pipes or conduits such as jumpers or spools 22. The pipeline 16 and the spools 22 are typically wet-insulated with a layer of polymeric thermal insulation that is exposed to the surrounding seawater. However, such insulation is conventional and so has been omitted from the drawings for ease of illustration.

The pipeline 16 may extend for several kilometres across the seabed 12 and typically then communicates with a riser that conveys the production fluid to a surface installation such as a platform or an FPSO (floating production, storage and offloading) vessel. The surface installation may also provide power and service fluids to the subsea installation 10, typically by cables and fluid ducts that extend along the riser to convey the power and fluids in an opposite direction to the flow of production fluid. Such a riser and surface installation are conventional and so have also been omitted from the drawings.

The installation 10 exemplified in FIG. 1 is further simplified to emphasise the main focus of the invention, namely the provision of electrical power to a trace heating system that extends along the pipeline 16 and the spools 22. For this purpose, a three-phase power supply 24 is shown schematically in FIG. 1, connected to respective heating cables 26 that extend in a parallel, mutually-spaced relationship along the pipeline 16 and the spools 22. In this example, the grouped heating cables 26 are wound helically around the pipeline 16 and the spools 22.

The power supply 24 could, for example, be housed on a surface installation that receives production fluid from the subsea installation 10 as mentioned above. In that case, electrical power for the heating cables 26 of the trace heating system may conveniently be conveyed along a riser extending between the pipeline 16 and the surface installation.

The heating cables 26 extend along the pipeline 16 to the PLET 20, where they terminate in a connector hub 28A for the connection of a corresponding number of external flying leads 30, each in series with a respective one of the heating cables 26. Conveniently, each flying lead 30 terminates at each end in double-barrier connectors that enable connection and disconnection of the flying leads 30 underwater, typically by an ROV.

The flying leads 30 effect electrical connection between the connector hub 28A on the PLET 20 and another connector hub 28B on the spool 22 that extends between the PLET 20 and the manifold 18. The connector hub 28B is connected electrically, in turn, to another group of heating cables 26 that extend along substantially the whole length of the spool 22 to terminate in a further connector hub 28C positioned on the spool 22 near where the spool 22 joins the manifold 18.

A further set of flying leads 30 extend between the connector hub 28C and another connector hub 28D on the other spool 22 that extends between the manifold 18 and the well tree 14. These flying leads 30 thereby bypass the manifold 18 interposed between the spools 22. The connector hub 28D is connected electrically, in turn, to another group of heating cables 26 that extend along substantially the whole length of that spool 22 to terminate in a further connector hub 28E positioned on the spool 22 near where the spool 22 joins the well tree 14.

Thus, by virtue of the flying leads 30 and the connector hubs 28A-28E, each heating cable 26 on the pipeline 16 is connected in series with a corresponding heating cable 26 on each spool 22. So, elegantly, the heating cables 26 on the spools 22 are powered via the heating cables 26 on the pipeline 16, without requiring separate power provisions such as multiple power supplies 24 or multiple connections such as umbilicals from one or more power supplies 24.

In the example shown in FIG. 1, a third set of flying leads 30 effects electrical connection between the connector hub 28E and a further external connector hub 28F mounted on a star end module 32 of the invention. The star end module 32 defines a neutral point 34 by short-circuiting the heating cables 26 that extend along the pipeline 16 and the spools 22. The star end module 32 thereby serves as a termination for the electrical circuit that comprises the various heating cables 26.

The star end module 32 is shown here mounted to the well tree 14 but could instead be mounted to a different subsea structure or item of equipment, whether part of the subsea installation 10 or otherwise. In principle, it would also be possible for the star end module 32 to rest on the seabed 12 independently, for example via a dedicated a subsea foundation.

Figure 2:
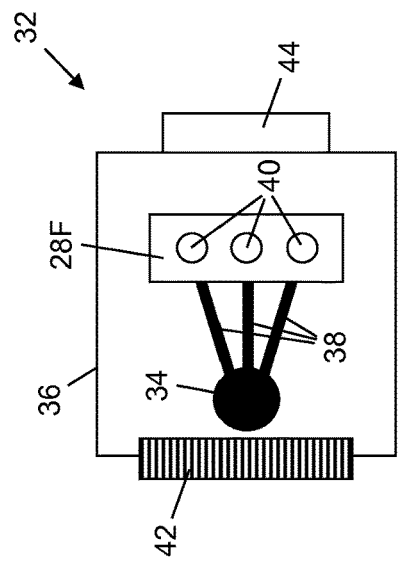
FIG. 2 is an enlarged schematic view of the star end module shown in FIG. 1.

The star end module 32 is shown in more detail in FIG. 2 of the drawings. It comprises a housing 36 that supports the three-phase connector hub 28F and electrical conductors 38 extending from each respective port or socket 40 of the connector hub 28F. The three conductors 38 converge and conjoin to define the neutral point 34. The housing 36 surrounds and encloses, embeds or encapsulates the neutral point 34 and the conductors 38.

In use, heat will be produced in consequence of the short circuit at the neutral point 34. A heat exchanger 42 in thermal communication with the neutral point 34 comprises external formations such as fins that increase the surface area of the heat exchanger 42, thereby to promote dissipation of that heat into the surrounding seawater. Similarly, the housing 36 itself may be shaped to define external heat-exchange formations and may be configured to conduct heat away from the neutral point 34.

Where the star end module 32 is to be mounted to a subsea structure or item of equipment such as the well tree 14 shown in FIG. 1, the module 32 is conveniently provided with a mount 44 as also shown in FIG. 2. The mount 44 may be a temporary coupling or a permanent or integral coupling.

Figure 3:
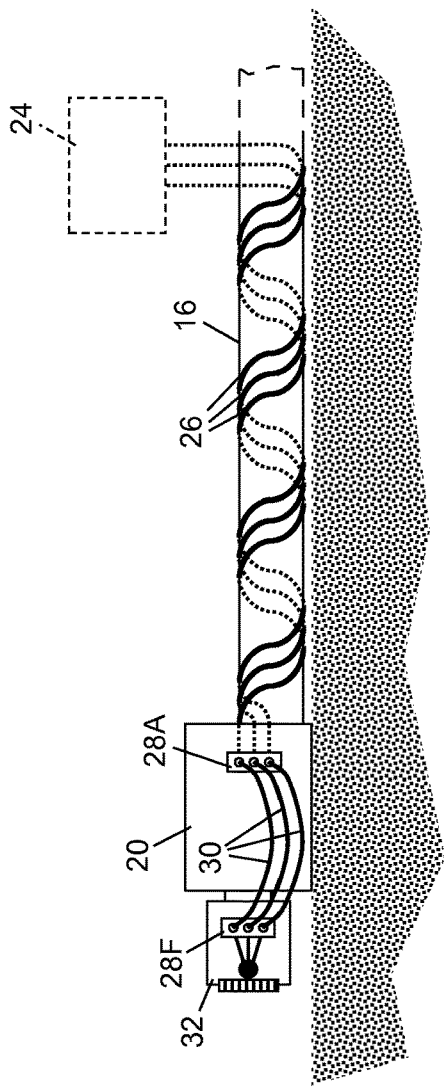
FIG. 3 is a schematic side view of the star end module of the invention connected to a different part of the subsea installation shown in FIG. 1.

The connector hubs 28A-28F, the subsea-connectable flying leads 30 and the star end module 32 facilitate convenient modular subsea expansion or reconfiguration of the subsea installation 10. In this respect, FIG. 3 shows the star end module 32 instead mounted on the PLET 20. The connector hub 28F of the star end module 32 is connected by a set of flying leads 30 directly to the connector hub 28A of the PLET 20, which is connected in turn to the heating cables 26 that extend along the pipeline 16.

Thus, the star end module 32 can conveniently be positioned and connected to define a neutral point 34 by short-circuiting the heating cables 26 of the pipeline 16. The same star end module 32, or an additional star end module 32 may be used or re-used to define an alternative neutral point 34 by short-circuiting other heating cables 26 in a larger subsea installation 10 like that shown in FIG. 1.

Figure 4:
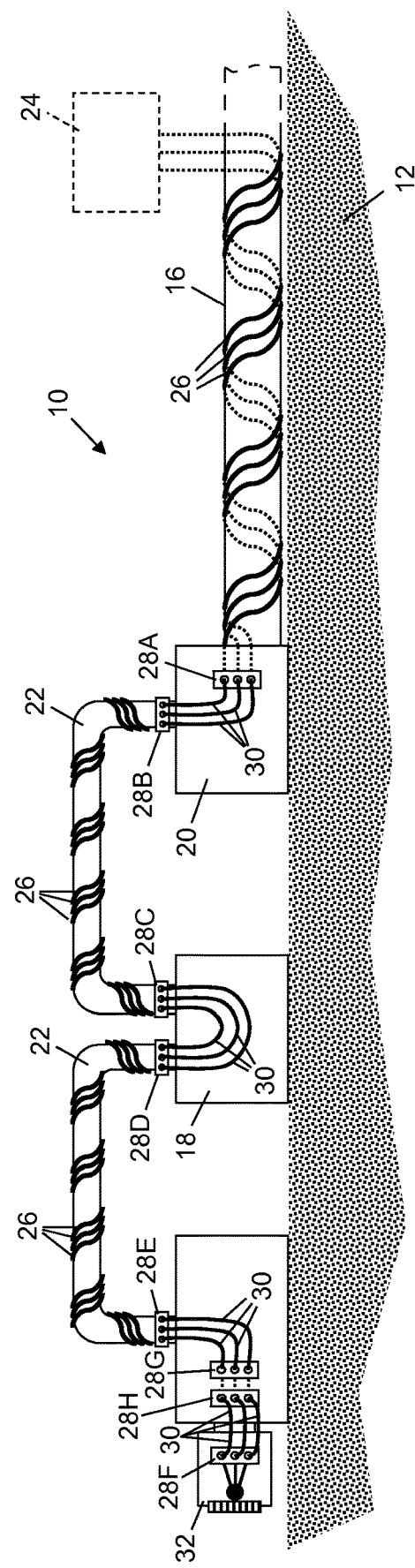
FIG. 4 is a schematic side view of a subsea installation in a variant of the arrangement shown in FIG. 1.

Finally, FIG. 4 of the drawings shows a variant of the arrangement shown in FIG. 1 in which like numerals are used for like features. FIG. 4 differs from FIG. 1 in the arrangement of the electrical connection between the star end module 32 and the heating cables 26 of the spool 22 that adjoins the well tree 14. Specifically, in FIG. 1, the third set of flying leads 30 connects directly between the connector hub 28E of the spool 22 and the connector hub 28F of the star end module 32. Conversely, in FIG. 4, electrical connection between the connector hub 28E of the spool 22 and the connector hub 28F of the star end module 32 is made via electrical connections in the well tree 14.

Thus, FIG. 4 shows the third set of flying leads 30 now extending between the connector hub 28E and a connector hub 28G mounted on the well tree 14. The connector hub 28G is connected electrically to a further connector hub 28H mounted on the well tree 14, A fourth set of flying leads 30 effects parallel electrical connections between that connector hub 28H and the connector hub 28F of the star end module 32.

Many other variations are possible within the inventive concept. For example, like the connector hub 28A on the PLET 20, the connector hub 28B shown in FIGS. 1 and 4 could instead be implemented on the PLET 20. In that case, electrical connections may extend through the PLET 20 between the connector hub 28B and the associated heating cables 26. Conversely, the connector hub 28A could be implemented on the pipeline 16 so that no electrical connections extend through the PLET 20 between the heating cables 26 and the connector hub 28A.

The connector hubs 28E and 28H shown in FIG. 4 could be directly coupled or plugged together without intermediate leads.

Similarly, the connector hubs 28C and/or 28D shown in FIGS. 1 and 4 could instead be implemented on the manifold 18, with corresponding electrical connections being provided through the manifold 18. Also, the connector hub 28E shown in FIGS. 1 and 4 could instead be implemented on the well tree 14, with corresponding electrical connections being provided through the well tree 14.

Other variations are possible without departing from the inventive concept. For example, the pipeline 16 and/or the spools 22 could by insulated thermally by a dry insulation system based upon a concentric pipe-in-pipe assembly. In that case, the heating cables 26 would typically be disposed within an insulating annulus defined between inner and outer pipes of the assembly.

In the examples shown, the parallel heating cables 26 are wound helically around the pipeline 16 and the spools 22 but other arrangements are possible. For example, the heating cables 26 could instead extend substantially straight along the pipeline 16 and/or the spools 22, substantially parallel to the flow of the production fluid within.

The power supply 24 could be connected to the heating cables 26 by a dedicated umbilical hanging from the surface instead of via a riser. Alternatively, the power supply 24 could be located underwater.

A set of flying leads 30 could be integrated into or otherwise permanently connected to the star end module 32, hence potentially obviating the connector hub 28F shown on the star end module 32 in the drawings.

The invention claimed is:

1. A subsea installation for the production of hydrocarbons, the installation comprising:
    a flowline terminated at its ends by terminal structures;
    a first group of heating cables extending along the flowline, the heating cables of the first group being connected to a three-phase power supply and arranged to carry three electrical power phases; and
    a termination effecting short-circuit connection between the heating cables of the first group;
    wherein the termination is located at a subsea location remote from the flowline.

2. The installation of claim 1 and further comprising at least one connecting conduit in fluid communication with the flowline, wherein the termination is connected electrically to the first group of heating cables via at least one second group of heating cables that extends along the or each connecting conduit.

3. The installation of claim 2, wherein the or each connecting conduit is a jumper or spool in fluid communication with at least one subsea structure that is in fluid communication with the flowline.

4. The installation of claim 1, wherein at least one subsea structure in fluid communication with the flowline is interposed between the termination and the flowline.

5. The installation of claim 4, wherein the termination is mounted on the at least one subsea structure interposed between the termination and the flowline.

6. The installation of claim 4, wherein electrical connection between the termination and the first group of heating cables is made via electrical connections in the at least one subsea structure interposed between the termination and the flowline.

7. The installation of claim 4, wherein electrical connection between the termination and the first group of heating cables bypasses the at least one subsea structure interposed between the termination and the flowline.

8. The installation of claim 3, wherein the subsea structure is a wellhead, a manifold, or a pipeline accessory.

9. The installation of claim 1, wherein the termination is connected electrically to the first group of heating cables via at least one set of ROV-connectable flying leads.

10. The installation of claim 9, further comprising connector hubs to which the flying leads are ROV-connectable.

11. The installation of claim 1, wherein the termination comprises:
    connectors corresponding to the heating cables of the first group; and
    conductors extending from the connectors to a neutral point.

12. The installation of claim 11, wherein the termination further comprises heat-exchange formations in thermal communication with the neutral point.

13. The installation of claim 11, wherein the termination further comprises a housing that supports the connectors and that surrounds the conductors and the neutral point.

14. The installation of claim 11, wherein the termination further comprises a mount or foundation for supporting the termination.

15. The installation of claim 11, wherein the connectors of the termination comprise a set of ROV-connectable flying leads.

16. The installation of claim 11, wherein the connectors of the termination comprise at least one connector hub that is engageable with a set of ROV-connectable flying leads.

17. A method of installing a subsea installation for the production of hydrocarbons, the method comprising:
    placing a termination at a subsea location remote from an electrically heated subsea flowline, the flowline being terminated at its ends by terminal structures; and
    electrically connecting the termination to a first group of heating cables extending along the flowline to effect short-circuit connection between the heating cables, the heating cables of the first group being connected to a three-phase power supply and arranged to carry three electrical power phases.

18. The method of claim 17, comprising connecting the termination to the first group of heating cables via a set of flying leads connected underwater between the termination and the heating cables.

19. The method of claim 17, comprising interposing at least one subsea structure between the termination and the flowline, the at least one subsea structure being in fluid communication with the flowline.

20. The method of claim 19, comprising electrically connecting the termination to the first group of heating cables via electrical connections in the at least one subsea structure interposed between the termination and the flowline.

21. The method of claim 19, comprising electrically connecting the termination to the first group of heating cables via electrical connections that bypass the at least one subsea structure interposed between the termination and the flowline.

22. The method of claim 19, comprising mounting the termination on the at least one subsea structure interposed between the termination and the flowline.

23. The method of claim 17, comprising interposing at least one connecting conduit between the termination and the flowline, the connecting conduit being in fluid communication with the flowline.

24. The method of claim 23, comprising:
electrically connecting the first group of heating cables to a second group of heating cables extending along the connecting conduit; and
connecting the termination to effect short-circuit connection between the heating cables of the first and second groups.

25. The method of claim 24, comprising connecting a set of flying leads underwater between the first and second groups of heating cables.

\* \* \* \* \*